United States Patent
Buri

(10) Patent No.: US 6,305,518 B1
(45) Date of Patent: Oct. 23, 2001

(54) CLUTCH

(75) Inventor: Gerhard Buri, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/463,833

(22) PCT Filed: Jul. 25, 1998

(86) PCT No.: PCT/EP98/04676

§ 371 Date: Jan. 31, 2000

§ 102(e) Date: Jan. 31, 2000

(87) PCT Pub. No.: WO99/06727

PCT Pub. Date: Feb. 11, 1999

(30) Foreign Application Priority Data

Aug. 2, 1997 (DE) .............................. 197 33 518

(51) Int. Cl.⁷ .................................................. F16D 23/06
(52) U.S. Cl. .................... 192/53.34; 192/53.33; 192/114 T; 74/339
(58) Field of Search .................... 192/53.34, 114 T, 192/48.91, 53.33; 74/339; 475/320, 303

(56) References Cited

U.S. PATENT DOCUMENTS

| | | |
|---|---|---|
| 2,221,892 | 11/1940 | Orr . |
| 3,270,843 | 9/1966 | Ivandich . |
| 4,280,370 | 7/1981 | Schneiner . |
| 4,836,348 * | 6/1989 | Knodel et al. .................. 192/114 T |
| 5,425,437 * | 6/1995 | Nellums ............................ 192/53.3 |
| 5,507,376 * | 4/1996 | Skotnicki ......................... 192/48.91 |
| 5,544,727 * | 8/1996 | Braun ............................... 192/48.91 |
| 5,547,057 * | 8/1996 | Sperber ............................ 192/53.34 |
| 5,588,516 * | 12/1996 | Braun et al. ..................... 192/48.91 |

FOREIGN PATENT DOCUMENTS

| | | |
|---|---|---|
| 34 44 562 A1 | 6/1985 | (DE) . |
| 34 44 670 C1 | 7/1986 | (DE) . |
| 0 423 863 A | 4/1991 | (EP) . |
| 0 663 541 A1 | 7/1995 | (EP) . |

* cited by examiner

Primary Examiner—Charles A Marmor
Assistant Examiner—Saúl Rodriguez
(74) Attorney, Agent, or Firm—Davis & Bujold, P.L.L.C.

(57) ABSTRACT

The invention relates to a synchronizer clutch (1) comprising a sliding sleeve (17) with selector teeth (19), two synchronizing rings (28, 29) with locking teeth (30, 31) and friction surfaces (24, 25) situated on both sides of the sliding sleeve (17) and rotatable around a limited rotation angle, and two clutch bodies (20, 21) with coupling teeth (22, 23) and counter friction surfaces (26, 27) interacting with the synchronizing rings (28, 29) wherein the sliding sleeve (17) is constantly connected with a transmission element (3) by a sleeve guide (3) so as to be torsionally resistant and, when engaged, is connected with one of the clutch bodies (20, 21) with positive fit by the selector teeth (19) and the coupling teeth (22, 23). In order to prevent that the selector teeth (19) of the sliding sleeve (17) come into contact with the coupling teeth (22, 23) unhindered when changing gears and causing noise, the synchronizing rings (28, 29) are coupled with each other in a way such that when one side is engaged, the locking teeth (30) of the synchronizing ring (28) on the non-engaged side are in locked position.

8 Claims, 1 Drawing Sheet

CLUTCH

This application is a 371 of PCT/EP98/04676, filed Jul. 25, 1998.

BACKGROUND OF THE INVENTION

In clutches used to interrupt traction, i.e. during a gear shift an input shaft is separated from a prime mover by a clutch, it is possible to introduce a gear by engaging a clutch of the above described kind, by sliding selector teeth of a sliding sleeve into coupling teeth of a clutch body fastened to a transmission component to be coupled, such as a gear wheel or a transmission housing. In an engaged state, the torque is transmitted, via the clutch body, the coupling teeth, the selector teeth, the sliding sleeve and the sleeve guide from one transmission component to another transmission component, such as a gear wheel or a shaft or is supported on the transmission housing. The engaged gear determines the reduction ratio and thus the rotational speed ratio between the input shaft and an output shaft of the transmission. The non-coupled transmission components, e.g. freely rotating toothed wheels in constant engagement of the other gears, rotate at a differential rotational speed corresponding to their ratio to the engaged transmission components. If when changing from one gear to another, the parts to be coupled during the gear change are brought to a rotational speed almost equal, the selector teeth of the sliding sleeve can mesh in the coupling teeth of the clutch body to be engaged.

A synchronization device serves for this purpose. It essentially comprises friction surfaces, such as a friction cone on the clutch body, and friction surfaces, such as a countercone, on the synchronizing ring which in addition has locking teeth. The synchronizing ring rotates with the sliding sleeve, but it can rotate relative to the sliding sleeve between two stops around a limited rotation angle in order that a locking device, e.g. locking teeth on the synchronizing ring, is brought to a locking position.

If the sleeve is moved in direction of the clutch body to be engaged, the synchronizing ring is pressed with its countercone by flexible detent means against the friction cone of the clutch body. At the same time, the synchronizing ring rotates relative to the sleeve so that inclined surfaces on the front side of the selector teeth strike upon corresponding locking surfaces of the locking teeth. Thereby an axial force is exerted upon the synchronizing ring and the friction surfaces. The shifting force simultaneously produces, via the inclined surfaces, a restoring force upon the synchronizing ring. During synchronous speed of the parts, the force outbalances the peripheral force, acting on the friction surfaces, and brings the synchronizing ring to a central position in which the sleeve can be completely engaged.

Those clutches are known already, namely, from DE 34 445 62 A1 for clutches of planetary design and from DE 34 446 70 A1 for clutches of countershaft design.

In clutches where the gear shift is carried out from an engaged state via a neutral position to another shift position, under certain conditions of operation, it can occur that during the gear shift the sliding sleeve almost unhindered crosses the synchronizing ring that has not, or not enough, been turned to locking position and thereby the selector teeth touch the clutch teeth, which causes unpleasant noises and wear.

The problem, on which the invention is based, is to prevent noises and wear.

SUMMARY OF THE INVENTION

According to the invention, the synchronizing rings are coupled with each other so that in engaged state of one side of the clutch, the locking teeth of the synchronizing ring are necessarily in locking position upon the non-engaged side. Thereby the sliding sleeve can easily be moved from one shift position to the other shift position without striking upon the locking teeth of the corresponding synchronizing ring.

In an embodiment of the invention, it is proposed that the synchronizing rings have positive components meshing into each other on the facing front sides, conveniently in the form of cams which abut on each other on axially extending flanks. The cams can be guided between two stops into the sliding sleeve or in the sleeve guide and be rotatable around a limited angle of rotation relative to the sliding sleeve.

It can be particularly advantageous here that the torsional path be designed so that a synchronizing ring in one locking position can be rotated only in one direction. Since the coupling members are mechanically, firmly connected with the synchronizing rings, no vibrations or tensions of the synchronization device are generated as is the case, e.g. in spring components.

In the specification and in the claims, numerous features are shown and described in correlation. The expert will also regard the combined features separately, according to the problem to be solved, and form with them other logical combinations.

BRIEF DESCRIPTION OF THE DRAWINGS

An embodiment of the invention is shown in the drawing in which.

DESCRIPTION OF THE PREFERRED EMBODIMENTS

Figure 1:
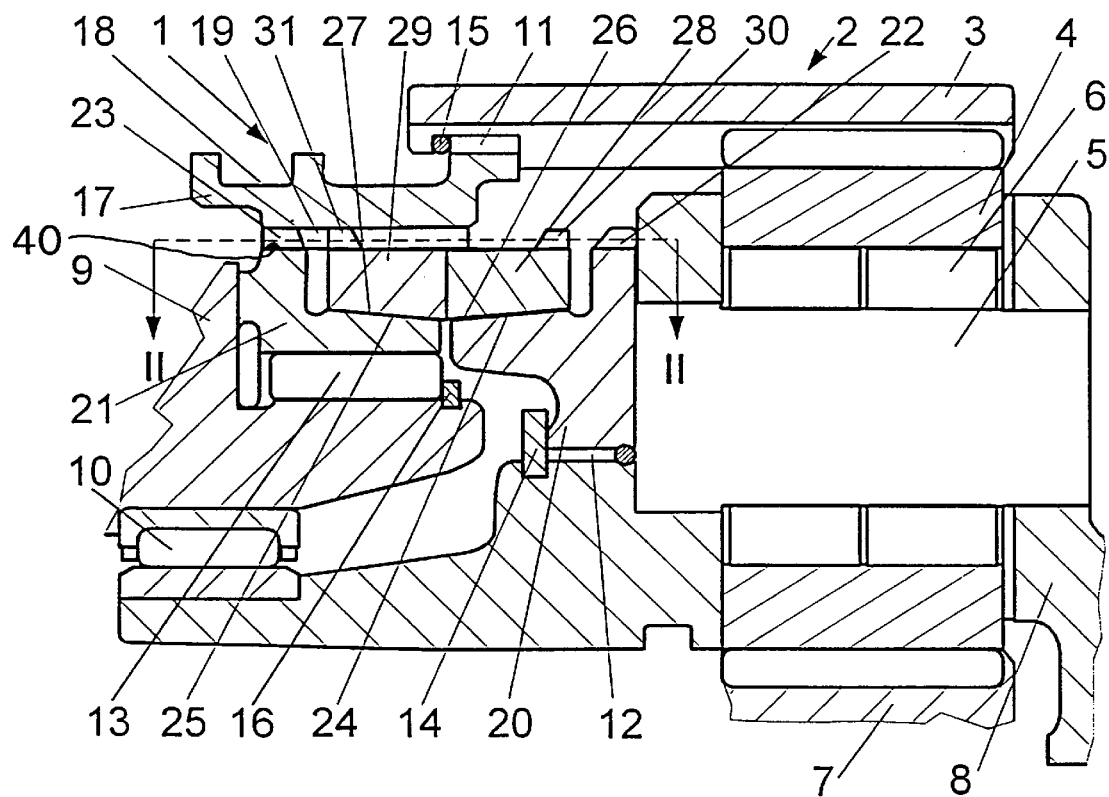
FIG. 1 is a partial longitudinal section through an inventive clutch.

A clutch 1 serves to engage a planetary step 2 which comprises a ring gear 3, planetary gears 4 and a sun gear 7. The planetary gears 4 are supported on planetary shafts 5 of a planetary carrier 8 via anti-friction bearings 6. The sun gear 7 is connected with an input shaft (not shown in detail) and the planetary carrier 8 which, via an anti-friction bearing 10, is supported by a transmission housing 9 and is connected with an output shaft (not shown in detail).

The clutch 1 has a sliding sleeve 17 with a groove 18 for a selector fork (not shown in detail). It also has selector teeth 19. In the state, shown in the drawing, the selector teeth 19 mesh through locking teeth 31 of a synchronizing ring 29 in coupling teeth 23 of a clutch body 21.

The sliding sleeve 17 is non-rotatably connected by driving teeth 11 with the ring gear 3 which, at the same time, serves for guiding the sliding sleeve 17. The sliding sleeve 17 is axially secured in the ring gear 3 by a guard ring 15. The clutch body 21 is fixed to a transmission housing 9 by driving teeth 13 and a guard ring 16. In the state shown in the drawing, the ring gear 3 is thus connected with the transmission housing 9 via the sliding sleeve 17 and the clutch body 21.

One other clutch body 20 with clutch teeth 22 belongs to clutch 1, which is fixed on the planet carrier 8 via driving teeth 12 and a guard ring 14 and interacts with a synchronizing ring 28. If the sliding sleeve 17 is moved to the right, according to FIG. 1, there is a change to another gear or transmission group in which the ring gear 3 is connected with the planetary carrier 8 and rotates together with it.

The synchronizing rings 28,29 have distributed over their peripheries several cams 32, 33, each of which supports itself by an axially extending flank 34 on a corresponding flank 35 of another cam 32 (FIG. 2) belonging to the synchronizing ring 28. Outer flanks 36, 37 of the cams 32 and 33 makes possible between stops 38, 39 a limited turning angle. The synchronizing rings 28, 29 are coupled with each other by the cams 32, 33 so that one synchronizing ring 29 turns the other synchronizing ring 28 with its locking teeth 30 to a locking position as soon as it releases the passage for the selector teeth 19 and vice versa.

If the sliding sleeve 17 is moved to the right from the engaged position (FIG. 1), its selector teeth 19 strike upon the locking teeth 30 of the synchronizing ring 28. Thereby the synchronizing ring 28 is pressed with its friction cone 24 against a countercone 26. Due to the front side facet of the selector teeth 19 and of the locking teeth 30 (FIG. 2), there results, in a peripheral direction, a force component which rotates the synchronizing ring 28, together with the locking teeth 30 away from the locking position as soon as synchronous speed is attained between the sliding sleeve 17 and the clutch body 20. During synchronous speed, the selector teeth 19 can now mesh in the coupling teeth 22 of the clutch body 20 whereby the ring gear 3 is now coupled with the planetary carrier 8. The cam 32 of the synchronizing ring 28 simultaneously adjusts the cam 33 with the synchronizing ring 29 and the locking teeth 31 thereof in the locking position so that when changing back to the shift position shown in the drawing, the locking teeth 31, a friction cone 25 on the synchronizing ring 29 and a countercone 27 on the clutch body 21 become active.

The embodiment shows a clutch 1 for a planetary step 2, but the invention is also suited to transmissions of countershaft design. In this case, the sliding sleeve 17 is non-rotatably guided on a sleeve guide (not shown) connected with a shaft. The cams 32, 33 will then conveniently mesh, via orifices, in the sleeve guide which can serve simultaneously as rotation limit.

Figure 2:
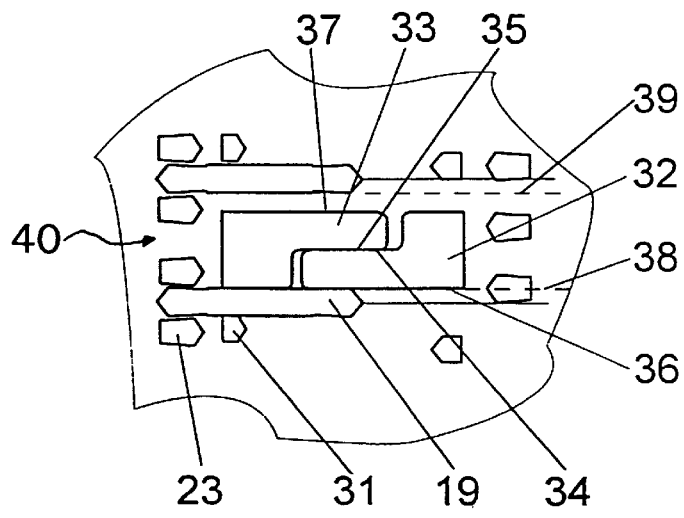
FIG. 2 is a partial development of a cylindrical section corresponding to the line II—II in FIG. 1.

The cams 32, 33 extend radially in a groove 40 provided in the sliding sleeve 17, as can be seen in FIGS. 1 and 2.

What is claimed is:

1. A clutch (1) comprising:
    a sliding sleeve (17) being non-rotatably connectable with a transmission component (3) via at least one guide (11) and the sliding sleeve (17) having selector teeth (19);
    first and second synchronizing rings (28, 29) each having locking teeth (30, 31) located for engagement with the selector teeth (19) of the sliding sleeve (17), the first and the second synchronizing rings (28, 29) being rotatable relative to the sliding sleeve (17) only over a limited angle of rotation, the first synchronizing ring (28) having a friction surface (24) located on a side thereof remote from the sliding sleeve (17), and the second synchronizing ring (29) having a friction surface ( 25) located on a side thereof remote from the sliding sleeve (17);
    first and second clutch bodies (20, 21) each having coupling teeth (22, 23) located for engagement with the selector teeth (19) of the sliding sleeve (17), the first clutch body (20) having a countercone friction surface (26) for interacting the friction surface (24) of the first synchronizer ring (28) and the second clutch body (21) having a countercone friction surface (27) for interacting the friction surface (25) of the second synchronizer ring (29) whereby, in an engaged state of the clutch, the sliding sleeve (17) is positively connected, via the selector teeth (19) and the coupling teeth (22 or 23), with one of the first and the second clutch bodies (20, 21);

wherein the first and the second synchronizing rings (28, 29) are coupled to rotate with one another so that the locking teeth (30) of the first synchronizing ring (28) and the locking teeth (31) of the second synchronizing ring (29) substantially always rotate with one another regardless of whether the sliding sleeve (17) is positively connected with the first clutch body (20) or the second clutch body (21).

2. The clutch (1) according to claim 1, wherein the first synchronizing ring (28) has at least one positive rotation transmitting component (32) which meshes with at least one positive rotation transmitting component (33) of the second synchronizing ring (29) to facilitate rotation of the first synchronizing ring (28) with the second synchronizing ring (29).

3. The clutch (1) according to claim 2, wherein the positive rotation transmitting components of the first and the second synchronizing rings (28, 29) are cams (32, 33) which abut with one another via axially extending flanks (34, 35) of the cams (32, 33).

4. The clutch (1) according to claim 3, wherein each of the cams (32, 33) are confined by a pair of stops (38, 39) which permit only the limited angle of rotation of the first and the second synchronizing rings (28, 29) relative to the sliding sleeve (17).

5. The clutch (1) according to claim 1, wherein the clutch is used in combination with a planetary gear which comprises, a sun gear, a ring gear and a planetary carrier supporting a plurality of planetary gears;
    the sliding sleeve (17) couples the ring gear to a transmission housing when the sliding sleeve (17) is connected to the first clutch body (20); and
    the sliding sleeve (17) couples the ring gear to the planetary carrier when the sliding sleeve (17) is connected to the second clutch body (21).

6. The clutch (1) according to claim 5, wherein the sun gear is connect to an input shaft to supply a rotational input to the planetary gear, and the planetary carrier is coupled to an output shaft to transmit a rotational output from the planetary gear.

7. A clutch (1) comprising:
    a sliding sleeve (17) being non-rotatably connectable with a transmission component (3) via at least one guide (11) and the sliding sleeve (17) having selector teeth (19);
    first and second synchronizing rings (28, 29) each having locking teeth (30, 31) located for engagement with the selector teeth (19) of the sliding sleeve (17), the first and the second synchronizing rings (28, 29) being rotatable relative to the sliding sleeve (17) only over a limited angle of rotation, the first synchronizing ring (28) having a friction surface (24) located on a side thereof remote from the sliding sleeve (17), and the second synchronizing ring (29) having a friction surface ( 25) located on a side thereof remote from the sliding sleeve (17);
    first and second clutch bodies (20, 21) each having coupling teeth (22, 23) located for engagement with the selector teeth (19) of the sliding sleeve (17), the first clutch body (20) having a countercone friction surface (26) for interacting the friction surface (24) of the first synchronizer ring (28) and the second clutch body (21) having a countercone friction surface (27) for interacting the friction surface (25) of the second synchronizer ring (29) whereby, in an engaged state of the clutch, the sliding sleeve (17) is positively connected, via the selector teeth (19) and the coupling teeth (22 or 23), with one of the first and the second clutch bodies (20, 21);

wherein the first and the second synchronizing rings (28, 29) are coupled to rotate with one another so that the locking teeth (30) of the first synchronizing ring (28) and the locking teeth (31) of the second synchronizing ring (29) substantially always rotate with one another regardless of whether the sliding sleeve (17) is positively connected with the first clutch body (20) or the second clutch body (21); and the cams (32, 33) extend radially in a groove of the sliding sleeve (17).

8. A clutch (1) comprising:

a sliding sleeve (17) being non-rotatably connectable with a transmission component (3) via at least one guide (11) and the sliding sleeve (17) having selector teeth (19);

first and second synchronizing rings (28, 29) each having locking teeth (30, 31) located for engagement with the selector teeth (19) of the sliding sleeve (17), the first and the second synchronizing rings (28, 29) being rotatable relative to the sliding sleeve (17) only over a limited angle of rotation, the first synchronizing ring (28) having a friction surface (24) located on a side thereof remote from the sliding sleeve (17), and the second synchronizing ring (29) having a friction surface ( 25) located on a side thereof remote from the sliding sleeve (17);

first and second clutch bodies (20, 21) each having coupling teeth (22, 23) located for engagement with the selector teeth (19) of the sliding sleeve (17), the first clutch body (20) having a countercone friction surface (26) for interacting the friction surface (24) of the first synchronizer ring (28) and the second clutch body (21) having a countercone friction surface (27) for interacting the friction surface (25) of the second synchronizer ring (29) whereby, in an engaged state of the clutch, the sliding sleeve (17) is positively connected, via the selector teeth (19) and the coupling teeth (22 or 23), with one of the first and the second clutch bodies (20, 21);

wherein the first and the second synchronizing rings (28, 29) are coupled to rotate with one another so that the locking teeth (30) of the first synchronizing ring (28) and the locking teeth (31) of the second synchronizing ring (29) substantially always rotate with one another regardless of whether the sliding sleeve (17) is positively connected with the first clutch body (20) or the second clutch body (21); and the synchronizing rings (28, 29) are rotatable in only one direction to facilitate movement to the locking position.

* * * * *